(12) United States Patent
Isono

(10) Patent No.: US 7,644,997 B2
(45) Date of Patent: Jan. 12, 2010

(54) MASTER CYLINDER WITH FILL-UP FUNCTION

(75) Inventor: Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 517 days.

(21) Appl. No.: 11/587,001

(22) PCT Filed: Jun. 15, 2005

(86) PCT No.: PCT/JP2005/011407

§ 371 (c)(1),
(2), (4) Date: Oct. 20, 2006

(87) PCT Pub. No.: WO2005/123475

PCT Pub. Date: Dec. 29, 2005

(65) Prior Publication Data

US 2007/0289827 A1 Dec. 20, 2007

(30) Foreign Application Priority Data

Jun. 16, 2004 (JP) ............................. 2004-178760

(51) Int. Cl.
*B60T 8/42* (2006.01)
(52) U.S. Cl. ................. 303/115.1; 303/116.2
(58) Field of Classification Search ............. 303/115.1, 303/113.1–113.5, 114.1–114.3, 115.2–115.6, 303/116.1, 116.2, 119.1
See application file for complete search history.

(56) References Cited

U.S. PATENT DOCUMENTS 6,953,229 B2 * 10/2005 Isono et al. ............... 303/114.1

2002/0084691 A1 7/2002 Isono et al.
2002/0124563 A1 9/2002 Ogiwara et al.

FOREIGN PATENT DOCUMENTS

| DE | 101 64 355 A1 | 8/2002 |
|---|---|---|
| GB | 2 123 503 A | 2/1984 |
| JP | Y-53-26548 | 7/1978 |
| JP | A-56-71655 | 6/1981 |
| JP | U 62-67867 | 4/1987 |
| JP | U 62-82268 | 5/1987 |
| JP | U 63-147356 | 9/1988 |
| JP | A 2-92764 | 4/1990 |
| JP | A 2000-203413 | 7/2000 |
| JP | A 2002-211383 | 7/2002 |
| JP | A 2002-321609 | 11/2002 |

* cited by examiner

*Primary Examiner*—Pam Rodriguez
(74) *Attorney, Agent, or Firm*—Oliff & Berridge, PLC

(57) ABSTRACT

A fill-up device of a master cylinder is included in a hydraulic brake system for an automotive vehicle and generates a hydraulic pressure corresponding to an operation of a brake operating member. A coupled switching valve is switched by being mechanically coupled with movement of a piston relative to a housing. The coupled switching valve is in a first state where a fill-up chamber is in communication with a reservoir via a relief valve until the piston is advanced by a predetermined distance from a rearmost position, and switched to a second state where the fill-up chamber is in direct communication with the reservoir via the communication passage without the relief valve disposed therebetween when the piston is advanced by a distance larger than the predetermined distance. Thus, the hydraulic pressure in the fill-up chamber rapidly decreases, and the hydraulic pressure in pressure chambers rapidly increase.

8 Claims, 6 Drawing Sheets

US 7,644,997 B2

MASTER CYLINDER WITH FILL-UP FUNCTION

TECHNICAL FIELD

The present invention relates to a master cylinder which is disposed in a hydraulic brake system for an automotive vehicle and produces a hydraulic pressure corresponding to an operation of a brake operating member. In particular, the invention relates to an improvement on a master cylinder with fill-up function.

BACKGROUND ART

A hydraulic braking system for an automotive vehicle typically includes a master cylinder, that is coupled with a brake operating member such as brake pedal, via a power boosting device such as vacuum booster or hydraulic booster, or alternatively directly without such a power boosting device interposed, so as to produce a master cylinder pressure corresponding to an operating force imposed on the brake operating member. There are two cases in one of which the master cylinder pressure is normally applied to a brake cylinder to operate a brake, and in the other of which a hydraulic pressure of a power-operated hydraulic pressure source provided separately from the master cylinder is normally supplied to the brake cylinder by being controlled by a hydraulic pressure control valve device, and in the event of a failure of the power-operated hydraulic pressure source or the hydraulic pressure control valve device, the master cylinder pressure is applied to the brake cylinder.

In either case, when the brake cylinder is operated by supply of a working fluid or a brake fluid from the master cylinder, a substantial amount of the brake fluid is required to be supplied before a braking effect actually starts to be given, since the brake fluid is consumed for extinguishing a brake clearance between a friction member and a brake rotor, or between the friction member and a pressing member that presses the friction member against the brake rotor, and for elastically deforming a relatively soft member such as sealing member. Such a supply of the brake fluid is called "fill-up", and it is conventional to equip the master cylinder with fill-up function.

More specifically, as disclosed in Patent Document 1 set forth below, for instance, a fill-up chamber is provided in the master cylinder, in addition to a pressure chamber the brake fluid in which is pressurized. The fill-up chamber is usually connected to the pressure chamber through a communication passage in which a check valve is disposed, and also to a low pressure source such as reservoir through a parallel circuit of a relief valve and a restricting portion. During a fluid pressure of the fill-up chamber is not larger than a relief pressure of the relief valve, the brake fluid of the fill-up chamber is supplied to the pressure chamber via the communication passage and the check valve, thereby implementing the "fill-up". With an increase in the fluid pressure of the pressure chamber (i.e., a master cylinder pressure), the fluid pressure of the fill-up chamber also increases to eventually exceeds the relief pressure, thereby opening the relief valve to allow the brake fluid to flow from the fill-up chamber to the low pressure source, whereat the fill-up terminates. In order to efficiently utilize a brake operating force in raising the master cylinder pressure, it is desirable that the fluid pressure of the fill-up chamber lowers down to the atmospheric pressure. Hence, the fill-up chamber is desirably in communication with the low pressure source by bypassing the relief valve. However, since during the fill-up it is necessary to raise the fluid pressure of the fill-up chamber beyond the relief pressure, a restricting portion is disposed in parallel with the relief valve.

Patent Document 1: JP-A-2002-211383

DISCLOSURE OF THE INVENTION

However, it is revealed that the arrangement where the fill-up chamber is connected to the low pressure source via the parallel circuit of the relief valve and the restricting portion can be further improved. For instance, when a brake pedal is depressed and then a constant depressing force is maintained, a delay occurs in braking. The constant depressing force equals a sum of a force acting on a piston based on the fluid pressure of the pressure chamber (which will be referred to as "pressure reaction force") and a force acting on the piston based on the fluid pressure of the fill-up chamber (which will be referred to as "fill-up reaction force"), where an elastic force of a return spring and a frictional force acting on various portions are disregarded. That is, only a part of the depressing force imposed on the brake pedal, which part is a remainder obtained by subtracting the fill-up reaction force from the overall depressing force, is utilized to brake a wheel. The fill-up reaction force decreases as the brake fluid flows out of the fill-up chamber via the restricting portion to the low pressure source. Hence, when the depressing force is kept constant, the fluid pressure of the pressure chamber gently rises as the fluid pressure of the fill-up chamber decreases, and the braking delays accordingly. This problem of braking delay is particularly significant when the depressing force is kept constant at a relatively low level.

When the brake pedal is gently depressed, the amount of the brake fluid as flowed out of the fill-up chamber into the low pressure source via the restricting portion increases, and a depressing stroke is wasted accordingly. This problem leads to an undesirable decrease in a total amount of the brake fluid supplied to the brake cylinder until the brake pedal reaches a limit of depression, or the pressurizing piston reaches the most advanced position.

In the above-described situations, the present invention has been developed to improve the master cylinder with the fill-up function, that is, to solve or alleviate the above-described problems.

To this end, the invention provides a master cylinder with fill-up function, comprising: (a) a master cylinder at least having a housing and two pistons slidably disposed in the housing to be capable of integrally moving at least in an forward direction, a pressure chamber and a fill-up chamber being formed between the housing and the two pistons; (b) a relief valve; and (c) a coupled switching valve which is mechanically coupled with an advancing movement of the two pistons relative to the housing, and operates such that the coupled switching valve is in a first state where the fill-up chamber is in communication with the exterior via the relief valve until the two pistons advance by a predetermined distance from a rearmost position, and placed in a second state where the fill-up chamber is directly communicated with the exterior not via the relief valve when the two pistons have advanced by the predetermined distance or more.

In the thus constructed master cylinder with the fill-up function, until the pistons advance by the predetermined distance from the rearmost position, the coupled switching valve is in a first state and the fill-up chamber is not directly communicated with a low pressure source. Hence, until the fluid pressure of the fill-up chamber reaches the relief pressure to allow the brake fluid in the fill-up chamber to flow to the low pressure source, the brake fluid in the fill-up chamber is necessarily supplied to the brake cylinder. Thus, the above-described problems, that is, the waste of the depressing stroke due to the flow of the brake fluid from the fill-up chamber to the low pressure source via the restricting portion, and the decrease in the total amount of the brake fluid supplied into the brake cylinder until bottoming of the pistons, are solved. When the pistons have advanced by the predetermined distance or more, the coupled switching valve allows the fill-up chamber to communicate with the low pressure source and thus the fluid pressure of the fill-up chamber rapidly decreases, thereby utilizing substantially an entire depressing force for the operation of the brake cylinder. Thus, the problem of the braking delay as described above is alleviated.

There will be described by way of examples modes of inventions recognized to be claimable by the present applicant. The inventions may be hereinafter referred to as "claimable inventions", and include at least the invention as defined in the appended claims. However, the inventions may further include an invention of a concept subordinate or superordinate to the concept of the invention defined in the appended claims, and/or an invention of a concept different from the concept of the invention defined in the appended claims. The modes are numbered like the appended claims and depend from another mode or modes, where appropriate, for easy understanding of the invention. It is to be understood that combinations of features of the claimable inventions are not limited to those of the following modes. That is, the claimable inventions are to be construed by taking account of the description following each mode, the description of the embodiments, and the other parts of the specification, and as long as the claimable inventions are constructed in this way, any one of the following modes may be implemented with one or more features added, or one or more of a plurality of features included in any one of the following modes are not necessarily provided all together.

The following modes (1)-(8) respectively correspond to claims 1-8.

(1) A master cylinder with fill-up function, characterized by comprising:

a master cylinder at least having a housing and two pistons slidably disposed in the housing to be capable of integrally moving at least in an forward direction, a pressure chamber and a fill-up chamber being formed between the housing and the two pistons;

a relief valve; and a coupled switching valve which is mechanically coupled with an advancing movement of the two pistons relative to the housing, and operates such that the coupled switching valve is in a first state where the fill-up chamber is in communication with the exterior via the relief valve until the two pistons advance by a predetermined distance from a rearmost position, and placed in a second state where the fill-up chamber is communicated with the exterior directly and not via the relief valve when the two pistons have advanced by the predetermined distance or more.

(2) The master cylinder with fill-up function according to the mode (1), further comprising a check valve which is disposed in a communication passage which communicates the pressure chamber and the fill-up chamber with each other, and permits flow of a brake fluid from the fill-up chamber to the pressure chamber but inhibits flow of the brake fluid in the opposite direction.

According to this arrangement, it is possible to supply the brake fluid or working fluid from the fill-up chamber to the brake cylinder via the communication passage, with a simple device constituted by the communication passage having the check valve.

(3) The master cylinder with fill-up function according to the mode (2), wherein the communication passage is formed inside one of the two pistons which pressurize the brake fluid in the pressure chamber.

According to the arrangement where the communication passage is formed inside the piston, the device can be further simplified.

(4) The master cylinder with fill-up function according to any one of the modes (1) to (3), wherein the coupled switching valve is constituted by the housing and one of the two pistons.

As described later in the part of description of the embodiments, it is possible to dispose the coupled switching valve outside the master cylinder. However, by constituting the coupled switching valve by the housing and the piston, the piston can serve as a valve member. Further, the coupled switching valve is necessarily coupled mechanically with a movement of the piston relative to the housing, thereby omitting a coupling device. Thus, the cost of the master cylinder can be reduced.

(5) The master cylinder with fill-up function according to any one of the modes (1) to (4), wherein the relief valve is disposed in one of the two pistons.

When compared to an arrangement where the relief valve is disposed outside the master cylinder, the arrangement of the mode (5) makes the hydraulic brake system more compact. Where the piston is utilized as a housing of the relief valve, further simplification of the structure is realized.

(6) The master cylinder with fill-up function according to any one of the modes (1) to (4), wherein the relief valve is disposed in the housing.

According to this arrangement, an effect similar to that of the mode (5) can be obtained.

(7) The master cylinder with fill-up function according to any one of the modes (1) to (4), wherein the relief valve is disposed outside and separately from the housing.

(8) The master cylinder with fill-up function according to any one of the modes (1) to (7), wherein the pistons include a small-diameter piston and a large-diameter piston which integrally move in the forward and backward directions, the housing accommodates the small-diameter piston and the large-diameter piston such that the pressure chamber is formed on a front side of the small-diameter piston, and the fill-up chamber is formed on a front side of the large-diameter piston.

It may be arranged such that the large-diameter piston and the small-diameter piston are integrally formed into a stepped piston which is included in the pistons, and the housing has a stepped bore. Alternatively, it may be arranged such that the small-diameter piston and the large-diameter piston are separately formed and respectively fitted in a front cylinder bore and a rear cylinder bore that are separated from each other by a partition wall, and a transmission rod is disposed to fluid-tightly and slidably extend through the partition wall so as to transmit a force from the piston on the rear side to the piston on the front side. In the latter case, diameters of the front and rear pistons may be the same.

BEST MODE FOR CARRYING OUT THE INVENTION

Hereinafter, embodiments of the claimable inventions will be described, by referring to the accompanying drawings. The claimable inventions are not limited to the details of the following embodiments, but may be otherwise embodied with various modifications based on the knowledge of those skilled in the art, including the modes described above in the part "DISCLOSURE OF THE INVENTION".

Figure 1:
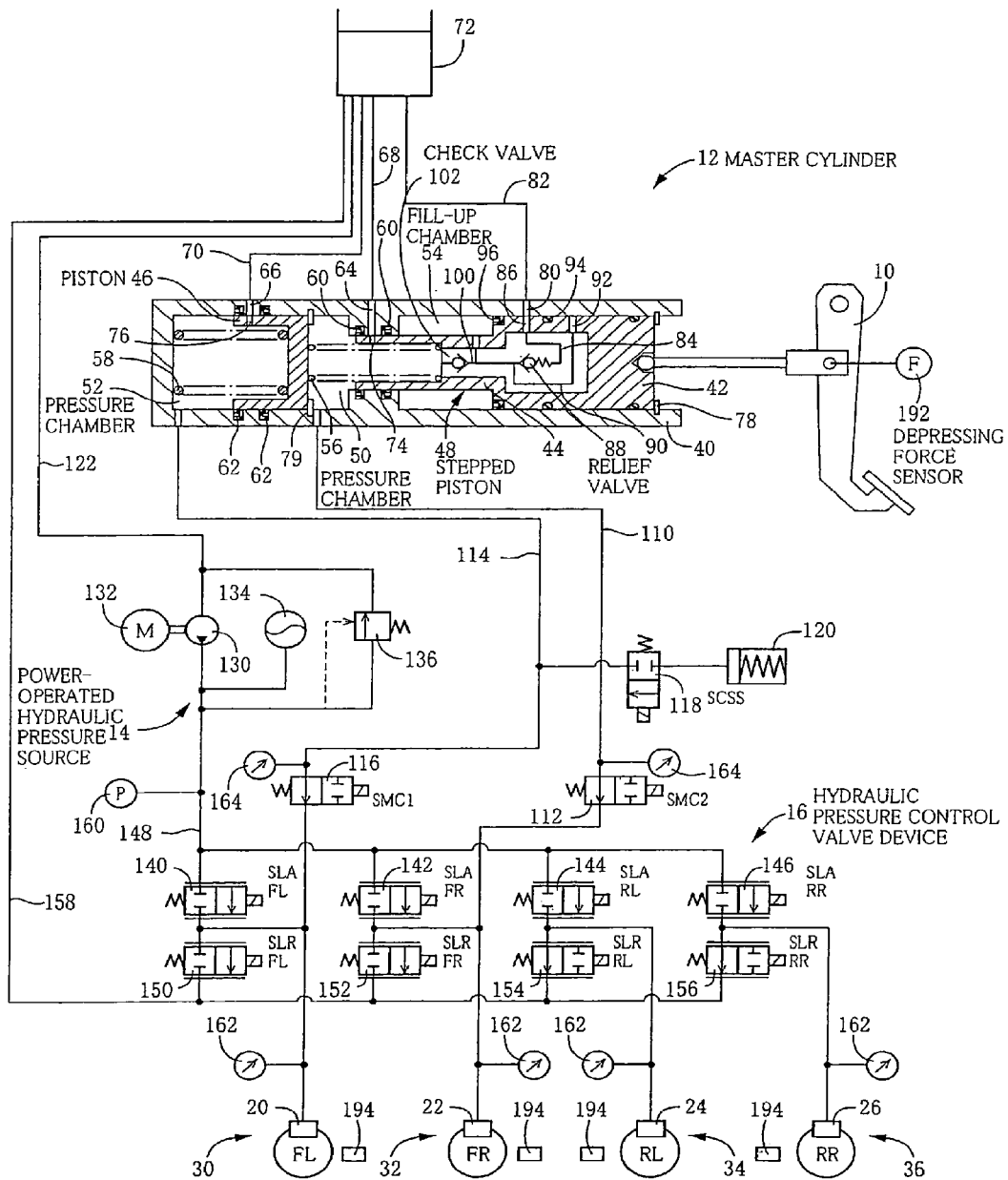
FIG. 1 is a partially cross-sectional circuit diagram of a hydraulic brake system including a master cylinder with fill-up function according to a first embodiment of the invention.

A hydraulic brake system including a master cylinder with fill-up function according to a first embodiment of the invention is shown in FIG. 1. This hydraulic brake system includes a brake pedal 10 as a brake operating member, the master cylinder 12, a power-operated hydraulic pressure source 14, a hydraulic pressure control valve device 16, brake cylinders 20, 22, 24, 26, and others. The hydraulic brake system normally operates such that a hydraulic pressure generated at the power-operated hydraulic pressure source 14 is controlled by the hydraulic pressure control valve device 16 and transmitted to the brake cylinders 20-26, so that brakes of a front left wheel 30, a front right wheel 32, a rear left wheel 34, and a rear right wheel 36 are operated by hydraulic pressures of the brake cylinders 20-26.

The master cylinder 12 includes a housing 40 having a stepped bore, and three pistons 42, 44, 46. The piston 42 and the piston 46 have a same diameter, and the piston 44 has a diameter smaller than that of the pistons 42, 46. The piston 44 having the smaller diameter (hereinafter referred to as "small-diameter piston") and the piston 42 having the diameter larger than that of the small-diameter piston (hereinafter referred to as "large-diameter piston") are integrally formed to form a stepped piston 48. The three pistons 42, 44, 46 are fluid-tightly and slidably fitted in the cylinder bore of the housing 40, forming a pressure chamber 50 on the front side of the small-diameter piston 44, a pressure chamber 52 on the front side of the piston 46, and a fill-up chamber 54 on the front side of the large-diameter piston 42 (between a stepped surface of the stepped piston 48 and a stepped surface of the housing 40).

The piston 42 is coupled with the brake pedal 10, and a pivotal movement of the brake pedal 10 is converted into a linear movement and transmitted to the piston 42. Between the stepped piston 48 and the piston 46, and between the piston 46 and a bottom of the housing 40, there is disposed a return spring 56, 58. An elastic force of the return spring 58 is set larger than that of the return spring 56, but a difference between the elastic forces is small, so that a hydraulic pressure substantially at the same level is generated in the pressure chamber 50 and the pressure chamber 52 (which will be referred to as "the master cylinder pressure").

On the housing 40 and at each of places corresponding to the pressure chambers 50, 52, a pair of cup seals 60, 62 are disposed. Between each pair of cup seals 60, 62 is disposed a port 64, 66 connected to a reservoir 72 storing a working fluid or a brake fluid at the atmospheric pressure, via a fluid passage 68, 70. In the pistons 42, 46, there are respectively formed communication passages 74, 76. In a state where the communication passages 74, 76 are opposed to the ports 64, 66, the pressure chambers 50, 52 are communicated with the reservoir 72 to allow flow of the brake fluid from the pressure chambers 50, 52 to the reservoir 72. When the pistons 42, 46 are at rearmost positions, the brake fluid is allowed to flow from the pressure chambers 50, 52 to the reservoir 72, that is, the communication passages 74, 76 and the ports 64, 66 are respectively opposed to each other. The rearmost positions of the pistons 42, 46 are defined by stoppers 78, 79.

The cylinder bore of the housing 40 has a port 80 at a place where the large-diameter piston 42 is fitted. The port 80 is connected to the reservoir 72 via a fluid passage 82. When the stepped piston 48 is at the rearmost position, the port 80 is opposed to a port connecting portion 86 of a communication passage 84 inside the large-diameter piston 42 to communicate the fill-up chamber 54 with the reservoir 72. In the communication passage 84, a relief valve 88 is disposed so that only when a hydraulic pressure of the fill-up chamber 54 is equal to or larger than a relief pressure, the flow of the brake fluid in a direction from the fill-up chamber 54 to the reservoir 72 is allowed. For convenience of illustration, FIG. 1 shows the relief valve 88 as if the relief vale 88 is disposed in a space defined inside the large-diameter piston 42, but actually the large-diameter piston 42 constitutes a housing of the relief valve 88.

In the large-diameter piston 42, there is disposed another communication passage 90 for communicating the fill-up chamber 54 with the exterior. On a side of the port connecting portion 86 near the brake pedal 10, a port connecting portion 92 for the communication passage 90 is disposed. To separate the communication passage 84 from the communication passage 90, an O-ring 94 is disposed on an outer circumferential surface of the large-diameter piston 42 and between the port connecting portion 86 and the port connecting portion 92. A cup seal 96 is disposed at an end of the large-diameter piston 42 on the side of the fill-up chamber 54, so as to inhibit the brake fluid from flowing out from the fill-up chamber 54 to the reservoir 72 via a clearance between the housing 40 and the large-diameter piston 42. In the present embodiment, when the O-ring 94 passes by the port 80 as the large-diameter piston 42 advances (leftward as seen in FIG. 1), the communication passage connected with the port 80 is switched from the communication passage 84 to the communication passage 90.

The small-diameter piston 44 has a communication passage 100 that communicates the fill-up chamber 54 with the pressure chamber 50. In the communication passage 100 is disposed a check valve 102 that permits flow of the brake fluid from the fill-up chamber 54 to the pressure chamber 50, but inhibits flow of the brake fluid in the opposite direction.

To the pressure chamber 50 of the master cylinder 12 with fill-up function, the brake cylinder 22 of the front right wheel 32 is connected through a master passage 110 in which is disposed a master cutoff valve 112 which is a normally-open solenoid shutoff valve. To the pressure chamber 52 is connected the brake cylinder 20 of the front left wheel 30 through a master passage 114 in which is disposed a master cutoff valve 116. A stroke simulator 120 is connected to the master passage 114 via a simulator control valve 118 that is a normally-closed solenoid shutoff valve. The reservoir 72 connected to the master cylinder 12 is connected to the power-operated hydraulic pressure source 14 also, through a fluid passage 122.

The power-operated hydraulic pressure source 14 includes a pump 130 that pumps up the brake fluid from the reservoir 72, an electric motor 132 that drives the pump 130, an accumulator 134 that accumulates the brake fluid as pressurized by the pump 130, and a relief valve 136 that limits a discharge pressure of the pump 130 to or under a predetermined value. The power-operated hydraulic pressure source 14 is connected to the four brake cylinders 20-26 via the hydraulic pressure control valve device 16.

The hydraulic pressure control valve device 16 includes pressure increase valves 140, 142, 144, 146 that respectively control flow of the brake fluid from the pump 130 to the respective brake cylinders 20-26, and the pressure decrease valves 150, 152, 154, 156 that respectively control flow of the brake fluid from the respective brake cylinders 20-26 to the reservoir 72. The pump 130 is connected to the pressure increase valves 140-146 through a pressure increase passage 148, and the reservoir 72 is connected to the pressure decrease valves 150-156 through a pressure decrease passage 158. The pressure increase valves 140-146 and the pressure decrease valves 150-156 are hydraulic pressure linear control valves that linearly controls the hydraulic pressure correspondingly to a supplied electric current. The pressure increase valves 140-146, and the pressure decrease valves 150, 152 for the front wheels, are normally-closed solenoid-controlled valves, and the pressure decrease valves 154, 156 for the rear wheels are normally-open solenoid-controlled valves.

Between the pump 130 and the pressure increase valve 140, a hydraulic-pressure-source pressure sensor 160 is disposed to detect the hydraulic pressure of the power-operated hydraulic pressure source 14. The hydraulic pressure of each of the brake cylinders 20-26 is detected by a brake cylinder pressure sensor 162. Between each of the two pressure chambers 50, 52 of the master cylinder 12 and the corresponding master cutoff valve 112, 116, there is disposed a master cylinder pressure sensor 164 that detects the hydraulic pressure generated in the pressure chamber 50, 52.

Figure 2:
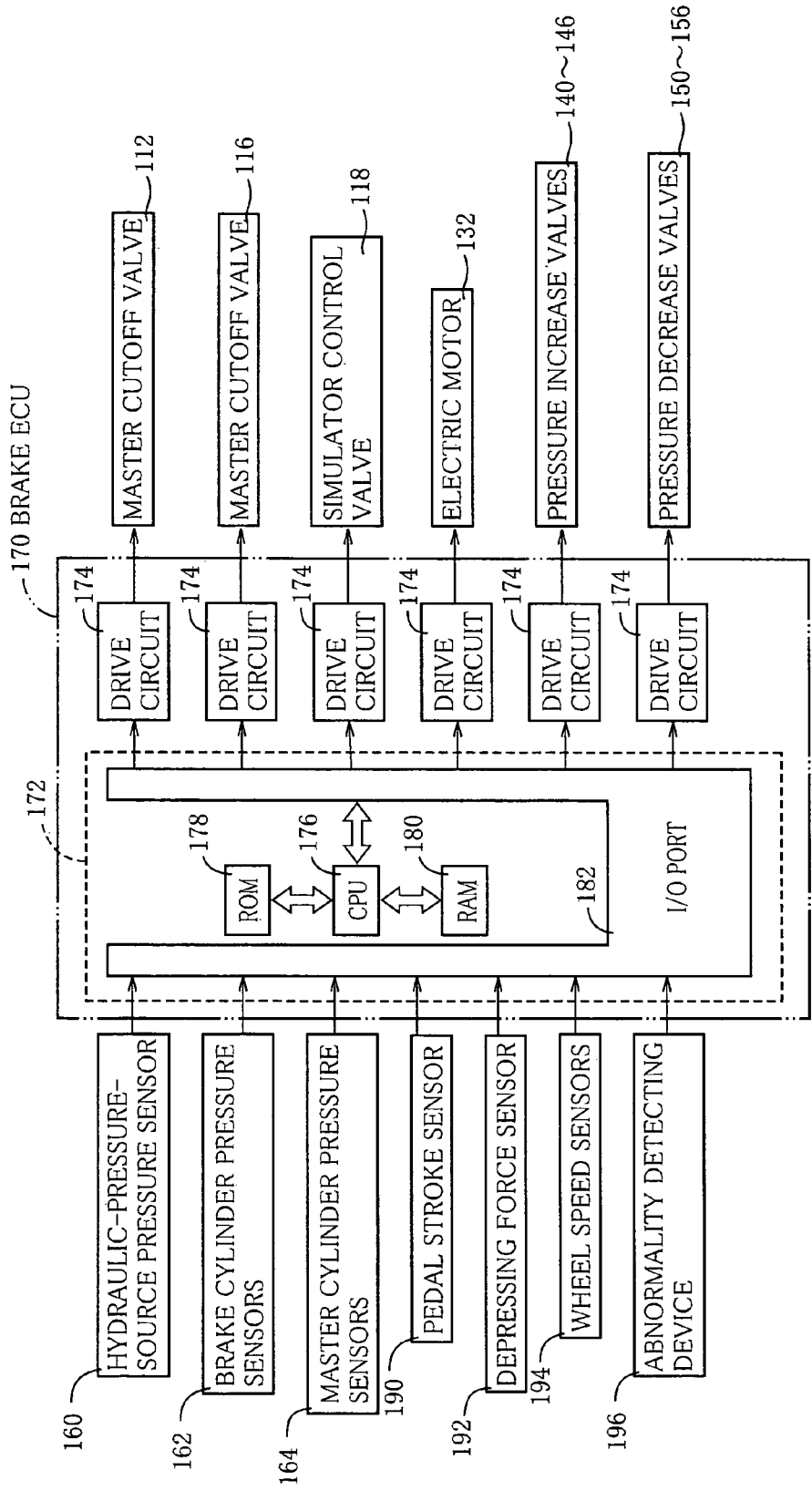
FIG. 2 is a block diagram of a brake ECU of the hydraulic brake system and its periphery.

The hydraulic brake system is controlled based on an instruction from a brake ECU (electronic control unit) 170 shown in FIG. 2. The brake ECU 170 includes a control portion 172 mainly constituted by a computer and a plurality of drive circuits 174. The control portion 172 includes a CPU 176, a ROM 178, a RAM 180, an input/output portion 182, and others. To an input of the input/output portion 182 are connected the hydraulic-pressure-source pressure sensor 160, the brake cylinder pressure sensors 162, the master cylinder pressure sensors 164, a pedal stroke sensor 190 that detects an operating stroke of the brake pedal 10, a depressing force sensor 192 that detects a depressing force imposed on the brake pedal 10, wheel speed sensors 194 that respectively detect rotational speeds of the wheels 30-36, an abnormality detecting device 196, and others. To an output of the input/output portion 182 are connected devices including the master cutoff valves 112, 116, the simulator control valve 118, solenoids of the pressure increase valves 140-146 and the pressure decrease valves 150-156, the electric motor 132, via the drive circuits 174.

The abnormality detecting device 196 detects occurrence of such an abnormality that the hydraulic pressure brakes can not be controlled in a normal fashion. For instance, the abnormality detecting device 196 detects a decrease in a power supply voltage to the electric motor 132 of the power-operated hydraulic pressure source 14, down to or below a predetermined value, and an abnormal operation of the control valves 140-146, 150-156 of the hydraulic pressure control valve device 16.

In the ROM 178 are stored various programs such as a brake hydraulic pressure control program and an antilock control program, flowcharts thereof are not presented, and a target brake-hydraulic-pressure determination table not shown, and others.

There will be described an operation of the thus constructed hydraulic brake system. The hydraulic brake system of this embodiment normally operates such that when an operator operates the brake operating member, the master cutoff valves 112, 116 are closed to shut off the brake cylinders 20-26 from the master cylinder 12, and the stroke simulator 120 is communicated with the master cylinder 12 to give the operator an operating feeling. The brake ECU 170 controls the pressure increase valves 140-146 and the pressure decrease valves 150-156 of the hydraulic pressure control valve device 16, based on an amount of an operation (at least one of an operating stroke and an operating force) of the brake pedal 10 by the operator, the wheel speeds, and a vehicle velocity, for instance, so that the hydraulic pressure in the brake cylinders 20-26 is increased or decreased so as to make a deceleration of the vehicle corresponding to the amount of the operation of the brake pedal 10.

Where a failure making a normal control impossible occurs in the power-operated hydraulic pressure source 14, the hydraulic pressure control valve device 16, or other portions of the brake system, an electric current is not supplied to the solenoids of the master cutoff valves 112, 116 and the simulator control valve 118, and these valves 112, 116, 118 are placed at original positions as shown, that is, the master cutoff valves 112, 116 are placed in a communicated state, and the simulator control valve 118 is placed in a shut-off state. That is, when the operator operates the brake pedal 10, a master cylinder pressure corresponding to the operating force imposed on the brake pedal 10 is produced, and the master cylinder pressure is applied to the brake cylinders 20, 22 to operate the brakes.

When the brake pedal 10 is depressed, the stepped piston 48 is advanced, thereby increasing the hydraulic pressure of the fill-up chamber 54 and that of the pressure chamber 50. While the hydraulic pressure of the fill-up chamber 54 is higher than that of the pressure chamber 50, the brake fluid in the fill-up chamber 54 is supplied to the pressure chamber 50 via the check valve 102, and then supplied to the brake cylinder 22 together with the brake fluid from the pressure chamber 50. The hydraulic pressure of the fill-up chamber 54 is increased until reaching the relief pressure of the relief valve 88. In this embodiment, the relief pressure is set at a value at which the fill-up is substantially finished. Thus, until the fill-up is finished, the brake fluid is kept supplied from both of the fill-up chamber 54 and the pressure chamber 50 to the brake cylinder 22, thereby enabling to rapidly complete the fill-up.

Upon the hydraulic pressure of the fill-up chamber 54 reaching the relief pressure, the brake fluid starts to flow to the reservoir 72 via the relief valve 88. Thereafter, the hydraulic pressure of the pressure chamber 50 is higher than that of the fill-up chamber 54, but the check valve 102 inhibits flow of the brake fluid from the pressure chamber 50 to the fill-up chamber 54. The brake cylinders 20, 22 do not receive the brake fluid from the fill-up chamber 54, but receive the brake fluid only from the pressure chambers 52, 50.

From a moment of initiation of the depression of the brake pedal to a moment of termination of the fill-up, the port 80 is held connected to the communication passage 84 in which the relief valve 88 is disposed, and the master cylinder is operated as described above (the first state). When the stepped piston 42 is further advanced from this state, the communication passage connected to the port 80 is switched from the communication passage 84 to the communication passage 90, so that the fill-up chamber 54 is directly communicated with the reservoir 72 (the second state). Thus, the hydraulic pressure of the fill-up chamber 54 rapidly returns substantially to the atmospheric pressure, and the pressure chamber 50 is pressurized by the entire depressing force.

When the stepped piston 48 slides backward, an inner volume of the fill-up chamber 54 increases. In the second state, an increase in the inner volume of the fill-up chamber 54 causes the brake fluid in the reservoir 72 to flow into the fill-up chamber 54 via the communication passage 90. In the first state, on the other hand, the brake fluid flows into the fill-up chamber 54 through the port 80 and the clearance between the cup seal 96 and the housing 40. Thus, it is prevented that the hydraulic pressure of the fill-up chamber 54 becomes negative.

Figure 3:
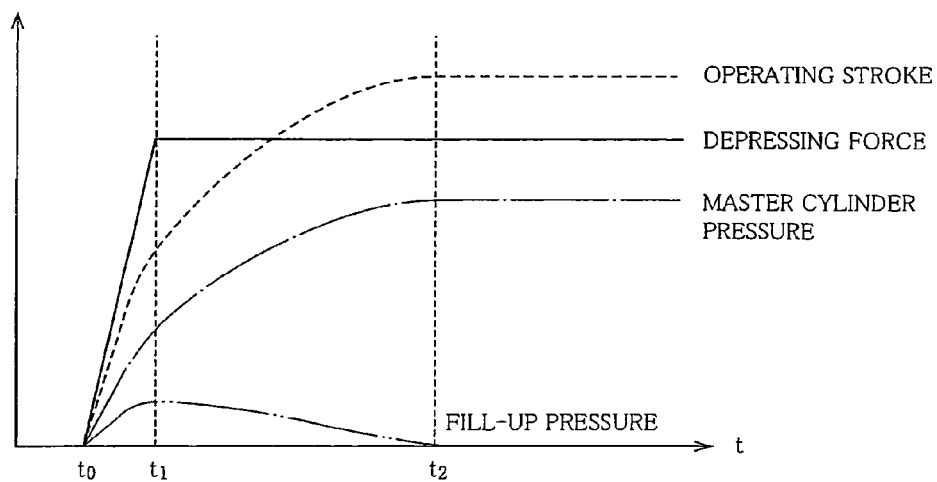
FIG. 3 is a graph illustrating a change in an operating state of a hydraulic brake system according to a conventional technique.
Figure 4:
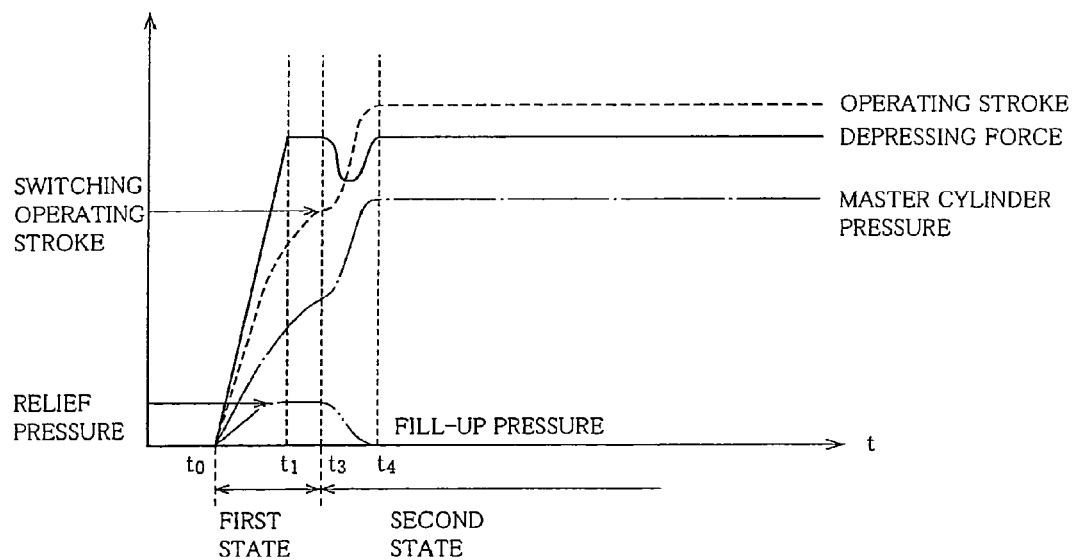
FIG. 4 is a graph illustrating a change in an operating state of the hydraulic brake system, according to the invention.

FIGS. 3 and 4 represent changes of the depressing force, the operating stroke, the master cylinder pressure, and the hydraulic pressure of the fill-up chamber (hereinafter referred to as "the fill-up pressure") with time. FIG. 3 shows an operating state of a conventional master cylinder 12 where the fill-up chamber is connected to the low pressure source via a parallel circuit of a relief valve and a restricting portion, in a case where the depressing force is held constant after the brake pedal is depressed. The depression of the brake pedal is initiated at a time point t0, and the depressing force reaches a constant value at a time point t1 after the termination of the fill-up and thereafter the constant value is maintained. From the time point t1 to the time point t2, as the brake fluid flows out from the fill-up chamber to the reservoir via the restricting portion, the fill-up pressure gradually decreases. With this decrease, the master cylinder pressure gently rises. That is, a braking delay occurs, and this delay is particularly significant when the depressing force is held constant at a relatively small value. Further, when the brake pedal is gently depressed, an amount of the brake fluid flowed from the fill-up chamber to the reservoir via the restricting portion is large, thereby causing a waste of the operating stroke.

On the other hand, FIG. 4 shows an operating state of the master cylinder 12 according to this embodiment. From a time point t1 to a time point t3 at which the state of the master cylinder 12 is switched to the second state, the brake fluid flows out of the fill-up chamber 54 by way of the relief valve 88 so that the fill-up pressure is held substantially at the relief pressure. When the state of the master cylinder 12 is switched to the second state at the time point t3, the fill-up chamber 54 is directly communicated with the reservoir 72, thereby rapidly decreasing the fill-up pressure. With this decrease in the fill-up pressure, the depressing force temporarily decreases, but the master cylinder pressure is rapidly raised, thereby alleviating the braking delay. Further, in the first state and until the fill-up pressure reaches the relief pressure of the relief valve 88, the brake fluid is not discharged from the fill-up chamber to the reservoir 72 and thus the brake fluid in the fill-up chamber 54 is necessarily supplied to the brake cylinders 22-26, thereby solving the problem of the waste of the operating stroke.

Figure 5:
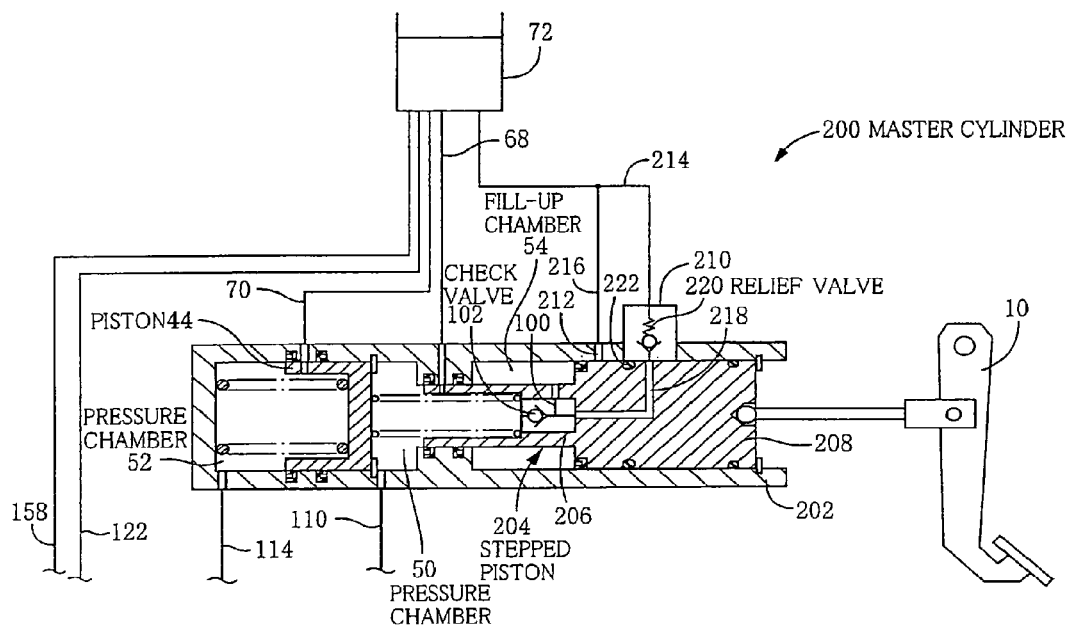
FIG. 5 is a partially cross-sectional circuit diagram of a hydraulic brake system including a master cylinder with fill-up function, according to a second embodiment of the invention.

In the above-described embodiment, the housing 40 and the large-diameter piston 42 of the stepped piston 48 constitute a coupled switching valve, and the relief valve 88 is disposed inside the stepped piston 48. However, the relief valve may be disposed in the housing. A second embodiment of the invention where the relief valve is disposed in the housing is shown in FIG. 5. Elements operating in the same way as the corresponding elements in the hydraulic brake system of the first embodiment are denoted by the same reference numerals to indicate the correspondence, and description thereof is dispensed with.

A master cylinder 200 includes a housing 202 having a stepped bore, and pistons 204, 44. The piston 204 is a stepped piston having a small-diameter piston 206 and a large-diameter piston 208 that are formed integrally. Similarly to the first embodiment, the three pistons, namely, the large-diameter piston 208, the small-diameter piston 206, and the piston 44, are fluid-tightly and slidably fitted in the cylinder bore of the housing 202, such that the pressure chambers 50, 52 are formed on the front side of the small-diameter piston 206 and the piston 44, respectively, and a fill-up chamber 54 is formed on the front side of the large-diameter piston 208.

The housing 202 has two ports 210, 212 at a place where the large-diameter piston 208 is fitted. The ports 210, 212 are connected to the reservoir 72 through fluid passages 214, 216, respectively. When the stepped piston 204 is located at a rearmost position, the port 210 is opposed to a communication passage 218 that communicates the fill-up chamber 54 formed in the piston 204 with the exterior. The port 210 has a relief valve 220 that allows flow of the brake fluid from the fill-up chamber 54 to the reservoir 72 while the hydraulic pressure of the fill-up chamber 54 is equal to or larger than a relief pressure.

An O-ring 222 is disposed on an outer circumferential surface of the large-diameter piston 208 and on a side of the communication passage 218 near the small-diameter piston 206. As the large-diameter piston 208 advances, the O-ring 222 passes by the port 212, thereby communicating the communication passage 218 with the port 212 in addition to the port 210, and directly communicating the fill-up chamber 54 with the reservoir 72. Thus, a coupled switching valve which switches between a first state where the fill-up chamber 54 is communicated with the reservoir 72 via the relief valve 220, and a second state where the fill-up chamber 54 is directly communicated with the reservoir 72 without the relief valve 220 disposed therebetween, is constituted by the housing 202 and the large-diameter piston 208 of the stepped piston 204. In the second embodiment, too, when the brake cylinders are operated by the brake fluid supplied from the master cylinder 200, the effects totally the same as those of the first embodiment can be obtained.

Figure 6:
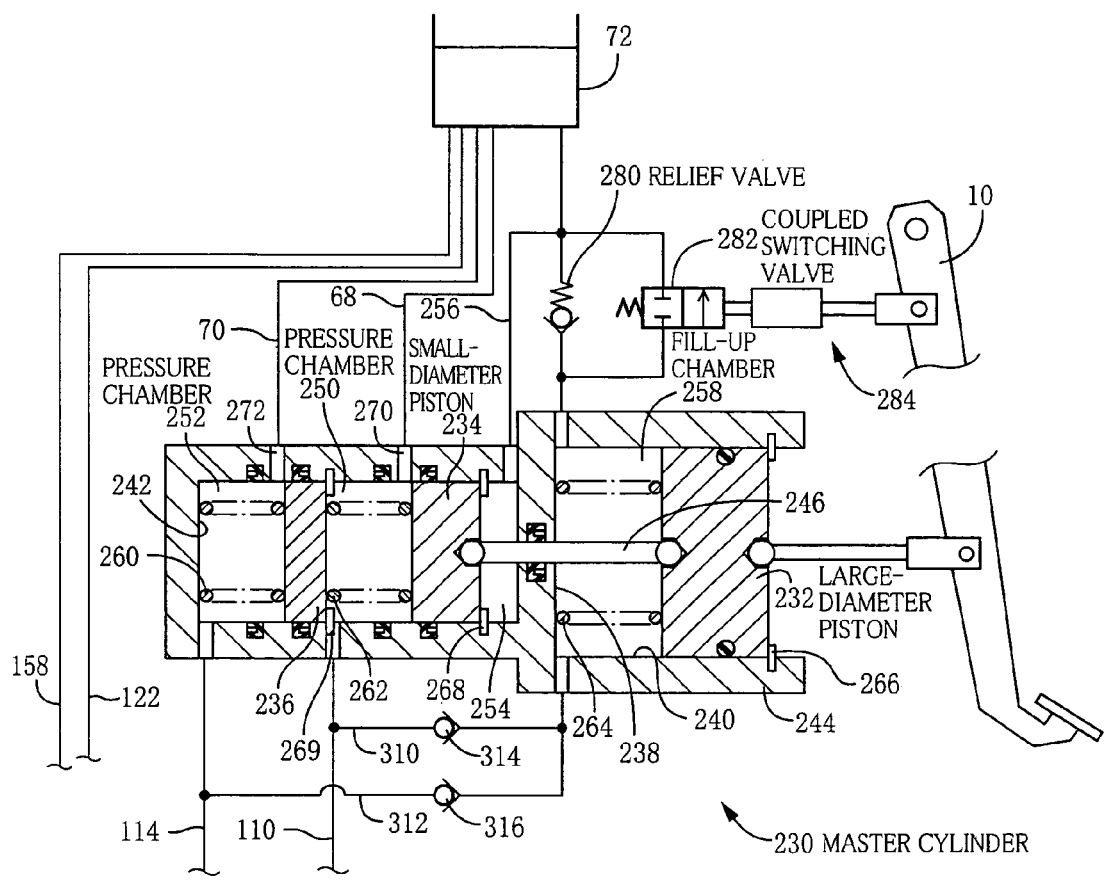
FIG. 6 is a partially cross-sectional circuit diagram of a hydraulic brake system including a master cylinder with fill-up function, according to a third embodiment of the invention.

Although in each of the two embodiments described above, the relief valve is disposed in the master cylinder 12, the relief valve may be disposed outside the master cylinder. Although in each of the above-described embodiments the communication passage 100 that establishes communication between the fill-up chamber 54 and the pressure chamber 50, and the check valve 102 that permits the flow of the brake fluid from the fill-up chamber 54 to the pressure chamber 50, are formed inside the stepped piston 48, 204, the communication passage and the check valve may be disposed outside the master cylinder. Although in each of the above-described embodiments the stepped piston 48, 204 integrally having the small-diameter piston 44, 206 and the large-diameter piston 42, 208 is employed, a small-diameter piston and a large-diameter piston that are separate from each other may be employed. A third embodiment of the invention where these arrangements are combined is shown in FIG. 6.

A master cylinder 230 includes three pistons 232, 234, 236 and a housing 244 having two cylinder bores 240, 242 arranged in a front-rear direction and separated by a partition wall 238. A large-diameter piston 232 and a small-diameter piston 234 that are respectively fitted in the cylinder bores 240, 242 are linked with each other by a transmission rod 246 fluid-tightly and slidably extending through the partition wall 238, so that an operating force imposed on a brake pedal 10 is transmitted to the large-diameter piston 232 linked with the brake pedal 10 and the small-diameter piston 234.

In the cylinder bore 242, a piston 236 is also fitted on the front side of the small-diameter piston 234, so that three fluid chambers are formed inside the cylinder bore 242. The fluid chamber on the front side of the small-diameter piston 234 is a pressure chamber 250 connected to a brake cylinder 22 of a front right wheel 32, the fluid chamber on the front side of the piston 236 is a pressure chamber 252 connected to the brake cylinder 20 of the front left wheel 30, and a fluid chamber 254 formed between the small-diameter piston 234 and the partition wall 238 is always held in communication with a reservoir 72 through a fluid passage 256.

Between the large-diameter piston 232 and the partition wall 238 is formed a fill-up chamber 258.

Between a bottom of housing 244 and the piston 236, between the piston 236 and the small-diameter piston 234, and between the partition wall 238 and the large-diameter piston 232, there are disposed return springs 260, 262, 264, respectively. Rearmost positions of the pistons 232, 234, 236 are defined by stoppers 266, 268, 269, respectively.

Ports 270, 272 are disposed in the housing 244 at places respectively corresponding to the pressure chambers 250, 252, and connected to respective communication passages 68, 70 extending from the reservoir 72. Only when the small-diameter pistons 234, 236 are at their rearmost positions, the pressure chambers 250, 252 are communicated with the reservoir 72.

The fill-up chamber 258 is connected to the reservoir 72 via a relief valve 280 and a shutoff valve 282 disposed parallel to the relief valve 280, and the shutoff valve 282 is mechanically linked with a brake pedal by a coupling device 284.

Figure 7:
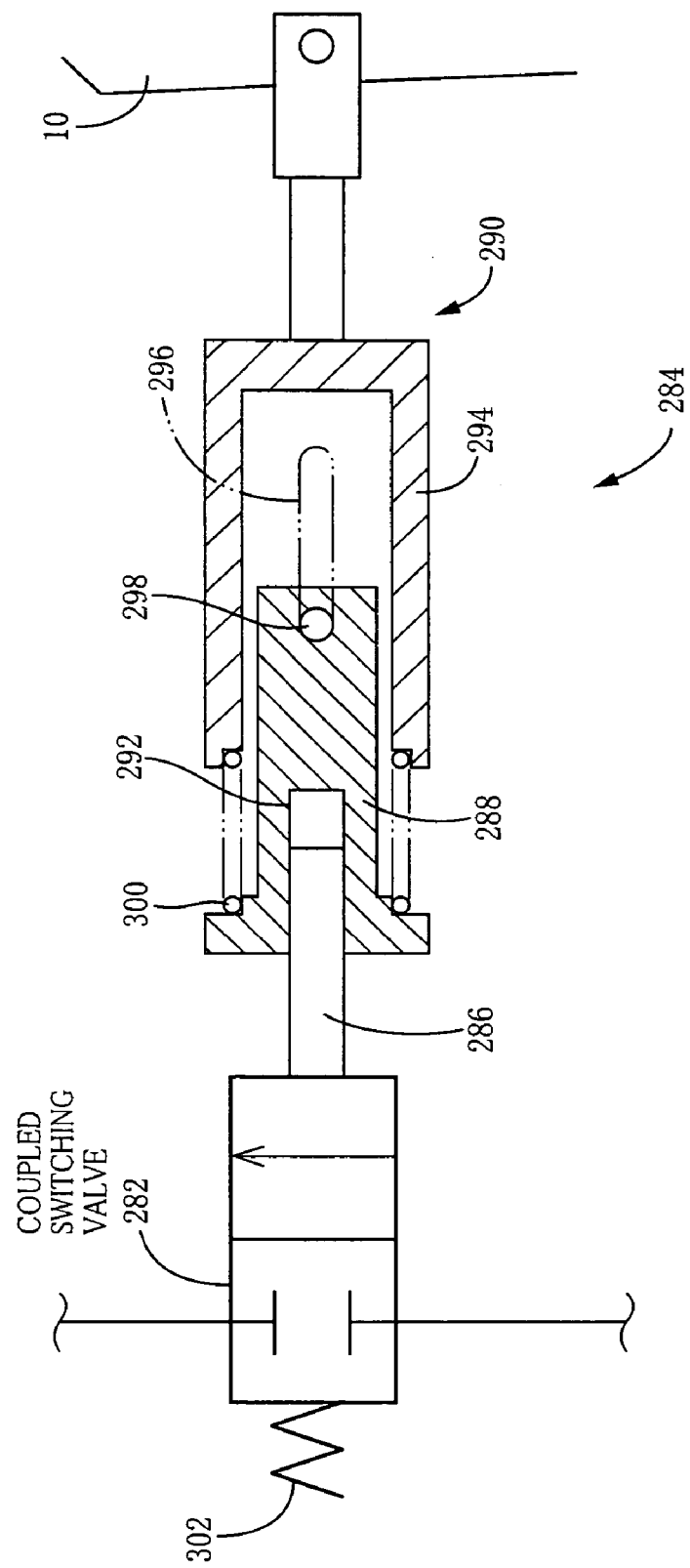
FIG. 7 is an enlarged view of a linking device that is a part of the hydraulic brake system shown in FIG. 6 and links a brake pedal with a coupled switching valve.

The coupling device 284 includes three rods 286, 288, 290, as shown in FIG. 7. The rod 286 as an operating portion of the shutoff valve 282 is slidably fitted in a guide hole 292 formed in the rod 288 that is connected to a connecting portion 294 of the rod 290 such that the rod 288 is rotatable and axially movable relatively to the connecting portion 294. The connecting portion 294 is cylindrical and has an internal diameter that is larger than an external diameter of the rod 288. The connecting portion 294 has a pair of elongate holes 296, with which pins 298 fixed on the rod 288 engage, so that the rod 288 and the rod 290 are connected to each other such that relative rotation and relative axial movement between these rods 288, 290 are allowed. A spring 300 is disposed between the rod 288 and the rod 290, and a set load of the spring 300 is larger than that of a spring 302 of the shutoff valve 282.

When the brake pedal 10 is depressed, the rods 288, 290 are integrally advanced until an end portion of the rod 286 is brought into contact with a bottom of the guide hole 292 in the rod 288, and when the brake pedal 10 is further depressed, the shutoff valve 282 is switched from a closed state to an open state. When the brake pedal 10 is still further depressed, the rod 290 advances relatively to the rod 288 while compressing the spring 300, thereby allowing further depression of the brake pedal 10.

As described above, when a stroke amount of the brake pedal 10 reaches a predetermined threshold, the shutoff valve 282 is switched from a closed state to an open state. The shutoff valve 282 constitutes a coupled switching valve that is held in a first state where the fill-up chamber 258 is communicated with the reservoir 72 via the relief valve 280, from the moment the depression of the brake pedal 10 is initiated to the moment the stroke amount reaches the predetermined threshold. The shutoff valve 282 is switched to a second state where the fill-up chamber 258 is directly communicated with the reservoir 72, when the stroke amount becomes equal to or larger than the predetermined threshold.

The fill-up chamber 258 is connected to the master passages 110, 114 via the communication passages 310, 312, in which check valves 314, 316 are respectively disposed. By this arrangement, while the hydraulic pressure of the fill-up chamber 258 is higher than that of the pressure chambers 250, 252, the brake fluid is supplied from both of the fill-up chamber 258 and the pressure chambers 250, 252 to the brake cylinders 22, 20, thereby enabling to rapidly complete the fill-up.

In the third embodiment, too, when the brake cylinders are operated by the brake fluid supplied from the master cylinder 230, the same effects as those of the above-described embodiments can be obtained.

The invention claimed is:

1. A master cylinder with fill-up function, comprising:
    a master cylinder at least having a housing and two pistons slidably disposed in the housing and integrally moving at least in a forward direction, a pressure chamber and a fill-up chamber formed between the housing and the two pistons;
    a reservoir for accommodating a brake fluid from the fill-up chamber;
    a relief valve; and
    a coupled switching valve which is mechanically coupled with an advancing movement of the two pistons relative to the housing, and operates such that the coupled switching valve is in a first state in which is permitted a flow of the brake fluid from the fill-up chamber to the reservoir via the relief valve until the two pistons advance by a predetermined distance from a rearmost position, and placed in a second state in which is permitted a flow of the brake fluid from the fill-up chamber to the reservoir not via the relief valve when the two pistons have advanced by the predetermined distance or more, wherein
    there are provided two flow routes of the brake fluid from the fill-up chamber to the reservoir, the two flow routes being provided in one of: (a) one of the two pistons and (b) the housing, and
    the coupled switching valve is configured to switch between passing of the brake fluid through one of the two flow routes and passing of the brake fluid through the other of the two flow routes, mechanically coupled with the advancing movement of the two pistons relative to the housing.

2. The master cylinder with fill-up function according to claim 1, further comprising a check valve which is disposed in a communication passage which communicates the pressure chamber and the fill-up chamber with each other, and permits a flow of the brake fluid from the fill-up chamber to the pressure chamber but inhibits a flow of the brake fluid in the opposite direction.

3. The master cylinder with fill-up function according to claim 2, wherein the communication passage is formed inside one of the two pistons which pressurizes the brake fluid in the pressure chamber.

4. The master cylinder with fill-up function according to claim 1, wherein the coupled switching valve is constituted by the housing and one of the two pistons.

5. The master cylinder with fill-up function according to claim 1, wherein:
    the two flow routes are provided in one of the two pistons, and the relief valve is disposed in one of the two pistons.

6. The master cylinder with fill-up function according to claim 1, wherein:
the two flow routes are provided in the housing, and
the relief valve is disposed in the housing.

7. The master cylinder with fill-up function according to claim 1, wherein:
the two flow routes are provided in the housing, and
the relief valve is disposed at the outside of the housing separately therefrom.

8. The master cylinder with fill-up function according to claim 1, wherein the pistons include a small-diameter piston and a large-diameter piston which integrally move in the forward and backward directions, the housing accommodates the small-diameter piston and the large-diameter piston such that the pressure chamber is formed on a front side of the small-diameter piston, and the fill-up chamber is formed on a front side of the large-diameter piston.

* * * * *